Aug. 17, 1948.                G. H. RENDEL                 2,447,208
           EXTENSOMETER FOR INDICATING PERCENT ELONGATION
Filed May 17, 1945                                 2 Sheets-Sheet 1
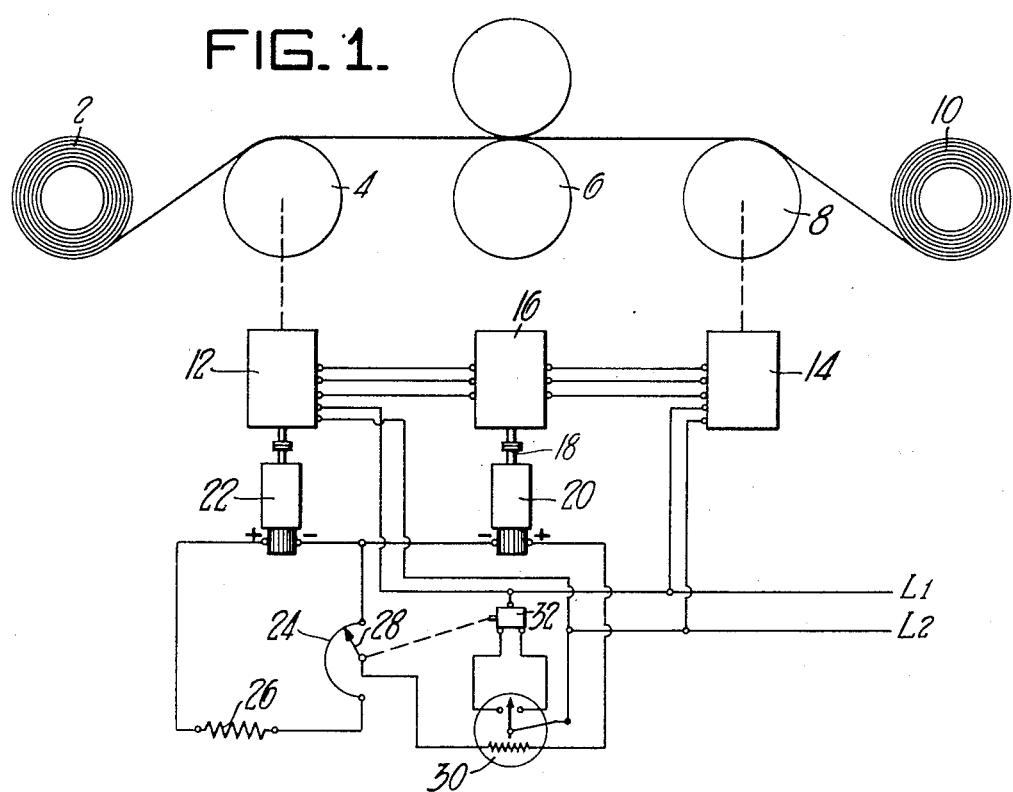
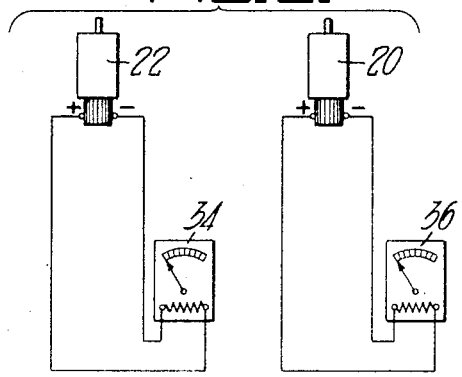
INVENTOR:
GEORGE H. RENDEL,
BY John E. Jackson
       his Attorney Aug. 17, 1948.   G. H. RENDEL   2,447,208
EXTENSOMETER FOR INDICATING PERCENT ELONGATION
Filed May 17, 1945   2 Sheets-Sheet 2
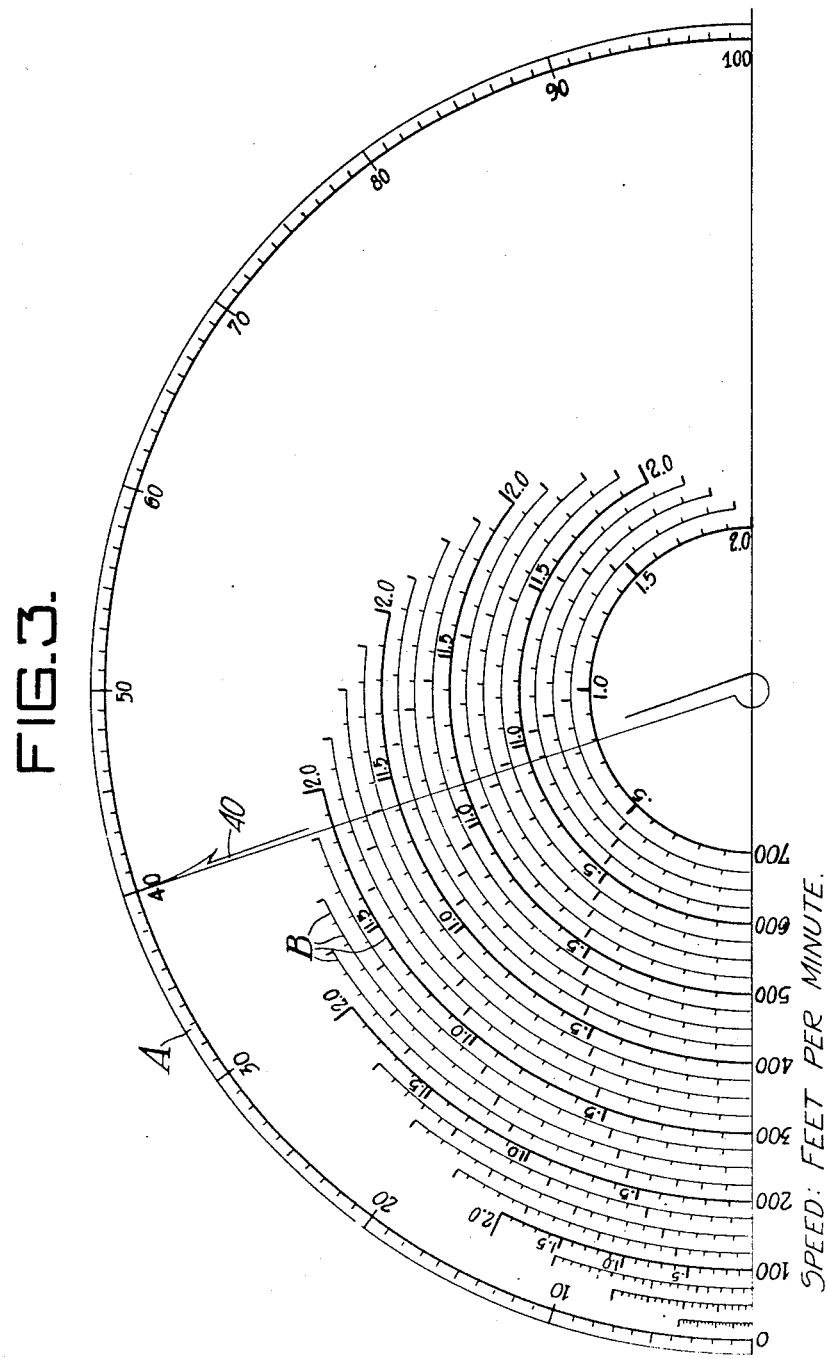
INVENTOR:
GEORGE H. RENDEL,
BY John E. Jackson
his Attorney.

Patented Aug. 17, 1948

2,447,208

UNITED STATES PATENT OFFICE 2,447,208

EXTENSOMETER FOR INDICATING PERCENT ELONGATION

George H. Rendel, Pittsburgh, Pa., assignor to Carnegie-Illinois Steel Corporation, a corporation of New Jersey Application May 17, 1945, Serial No. 594,240

9 Claims. (Cl. 177—311)

1

This invention relates to an extensometer and more particularly to an extensometer for indicating the elongation of strip in rolling mills or other reducing machines. In order to produce steel strip having desirable forming characteristics, a certain amount of work must be done on the material as it passes through the rolling mill. The work done elongates the strip and therefore the amount of rolling is usually referred to as "percent extension." Since the amount of extension is an important factor in obtaining the desired ductility or forming characteristics of the product, the amount of the extension must be closely controlled. This is particularly true in cold reducing the strip in a temper mill where the percent extension is very low.

Numerous attempts have been made to measure the amount of extension obtained in the moving strip, but none have proved to be entirely successful. Two of the principal drawbacks of the present devices are the inability to indicate the true amount of extension when the amount of elongation is very small and the inability to compensate for variations in speed. The first drawback is particularly noticeable at high strip speed. In some instances a generator is connected to be driven at a speed proportional to that of the entering strip and a second generator is connected to be driven at a speed proportional to that of the rolled strip. While these devices are fairly satisfactory where heavy drafts (30% in reduction or more) are taken, they may be as much as 200% in error when used in temper rolling where the extension may be between ¼% to 2%. This error rises from the fact that the reproducibility of a speed measurement made by means of a conventional electric generator may vary as much as plus or minus 1% and this variance is compounded when determining the percent extension. For example, if a 1% extension has been specified, the exit speed measuring potential would be 1% greater than that of the entry speed measuring potential. Since the potential of each generator may vary 1% of its true value, the reading indicated by the control meter may be 200% in error in respect to the actual conditions in the mill.

It is therefore an object of my invention to produce an extensometer which is accurate at all speeds and for all amounts of reduction.

This and other objects will be more apparent after referring to the following specification and attached drawings, in which:

Figure 1 is a schematic showing of one embodiment of my invention;

2

Figure 2 is a schematic view showing a modification of part of the extensometer of Figure 1; and Figure 3 shows a chart used with the second embodiment of my invention.

Referring more particularly to Figure 1 of the drawings, the strip is shown passing from an uncoiler 2 over the entry deflector roll 4, through the rolling mill 6, over the delivery deflector roll 8, and being rewound on the coiler 10. By way of example, the operation may be considered as temper rolling in which the reduction is very small and the strip is under tension. Since the strip is in contact with the deflector rolls, they will rotate with a peripheral speed corresponding to the strip speed at their respective locations. A motion transmitting device 12 is suitably driven from the entry deflector roll 4 and a second motion transmitting device 14 is driven from the delivery deflector roll 8. The motion transmitting devices 12 and 14 may be of any suitable type, but are shown here as the well known alternating current "Selsyn type," each device being provided with a three circuit armature winding and a single circuit field winding supplied from a source of alternating current L—1 and L—2. The transmitters 12 and 14 are electrically connected to a "Selsyn" receiver 16 which has a three circuit armature winding and a three circuit field winding, the armature of one of the transmitters being connected to the field of the receiver and the armature of the other transmitter to the armature of the receiver. The "Selsyn" transmitter and receivers are so constructed that rotation of either transmitter produces a synchronous rotating magnetic field in the winding of the receiver to which it is connected and the rotating field causes the armature of the receiver to rotate an equal amount so that the speed of rotation of the armature of the receiver is the algebraic sum of the speed of the transmitters. The forward motion of the strip in revolving the exit transmitter 14 produces a forward rotation of the field in receiver 16 while the same forward motion of the strip in revolving entry transmitter 12 causes the field of receiver 16 to rotate in the reverse direction so that receiver 16 rotates at a speed which is directly proportional to the difference of the entry and exit speeds of the strip. The shaft 18 is rotated by the transmitter 16 and is connected to a generator 20. The combination of the devices 12, 14 and 16 is the electrical equivalent of a differential gear system and the latter could be used in its stead. If both rolls 4 and 8 revolve at the same speed, the differential gearing is connected so that the shaft 18 will not move. If the rolls are revolved at different speeds, the shaft 18 will rotate at a speed equal to the difference of the roll speeds. In either case, the tachometer generator 20 is driven at a speed proportional to the difference in speed of the rolls 4 and 8 and its voltage output is directly proportional to the differential strip speed and can therefore serve as a basis for indicating and/or controlling the extension being effected by the mill. As only one generator is used which is driven by a differential receiver, the maximum possible error in the measurement of this difference is 1% (the inherent error of one speed measuring system). In the special case where the speed of rolling is constant, the performance of the mill can be visually indicated merely by connecting a volt meter across the terminals of generator 20 and calibrating it to read "percent extension."

In case the mill speed varies, the voltage output of generator 20 will vary directly with the mill speed even though the extension effected by the mill remains constant. Thus, if the voltage output from tachometer generator 20 is 100 millivolts when an extension of 1% is obtained at a strip speed of 100 feet per minute, the tachometer generator 20 will generate 2000 millivolts or 2 volts when the strip speed is raised to 2000 feet per minute with the same extension. From the foregoing it is seen that the output of generator 20 will not indicate the percent of extension at all speeds. In order to compensate for changes in the speed of the strip, a tachometer generator 22 is connected to be driven from transmitter 12. Since the voltage output of generator 20 varies directly with the differential strip speed and the mill speed, and the voltage output of generator 22 varies directly with the mill speed, the ratio between the two voltages will indicate the percent extension. The ratio between the two voltages can be measured in several ways and, as shown in Figure 1, the tachometer generator 22 is connected across the slide wire resistance of a voltage divider 24 through a resistance 26. The contact arm 28 of voltage divider 24 is connected to the positive terminal of generator 20 through a contact making galvanometer 30. The negative side of generator 20 is common to that of generator 22. The voltage drop across the slide wire 24 varies with the voltage of generator 22, and the drop between the contact arm 28 and the negative end of the slide wire 24 is a definite proportion of the total drop across the slide wire and is opposed by the voltage of generator 20. The opposed potentials can be balanced by adjusting the position of contact arm 28. When the opposed potentials are equal, the position of the contact arm 28 represents the ratio between the voltages of generators 20 and 22 and the slide wire 24 can be calibrated to read "percent extension." The contact making galvanometer 30 controls the operation and direction of rotation of a reversing motor 32 which is powered from the lines L—1 and L—2 and which is mechanically connected to the contact arm 28. The galvanometer is deflected when the opposed voltages are unequal and will cause the motor 32 to operate to move the contact arm 28 to increase or decrease the proportion of the voltage of the generator 22 as required to restore balance of the opposed voltages. Therefore, the position of the contact arm 28 will indicate the percent extension at all times.

In operation, if the strip is moving into the mill at 100 feet per minute and the mill is effecting a 1% extension, the voltage output of generator 22 may be assumed to be 1 volt and the output voltage of generator 20, 100 millivolts. The galvanometer 30, through the motor 32, will cause the contact arm 28 to balance at the 1% mark on the slide wire which is at the point where the drop between the negative end of the wire and the contact arm is 100 millivolts. If the mill speed is increased to 2000 feet per minute, the voltage output of generator 22 will increase to 20 volts, increasing the drop between the contact arm 28 and the negative end of the slide wire to 2 volts and the voltage of generator 20 simultaneously will increase to 2 volts so that the contact arm 28 will remain substantially at the 1% position. If the mill is now adjusted to produce 2% extension while operating at 2000 feet per minute, the voltage output of generator 20 will rise to 4 volts and the motor 32 will cause the contact arm 28 to move to the 2% mark on the slide wire 24 so that the drop between the contact arm 28 and the negative end of the slide wire 24 will rise to 4 volts.

Figure 2 discloses a modified form of the extensometer which is equally accurate but is less convenient to use. A volt meter 34 is connected across the terminals of generator 22 and is calibrated to read the operating speed of the mill in feet per minute. A second volt meter 36 is connected across the terminals of generator 20 and is provided with the chart shown in Figure 3. The scale A of Figure 3 is graduated in divisions 0 to 100, full scale corresponding to the voltage output of generator 20 when the mill is operating at full speed (700 feet per minute) and effecting an anticipated maximum amount of extension (2%). Other scales B, arranged on arcs concentric to scale A, are shown on Figure 3 and are calibrated to read "percent elongation" for various strip speeds in feet per minute. To determine percent elongation when there is a reading of 40 on scale A and when the meter 34 indicates a mill speed of 500 feet per minute, the percent extension will be indicated where the pointer 40 crosses chart B for 500 feet per minute. This is found to be approximately 1.1%.

While two modifications of my invention have been shown and described, it will be apparent that electronic means may be employed and that other adaptations and modifications may be made without departing from the scope of the following claims.

I claim:

1. An extensometer for determining the elongation of an elongated article passing through a reducing machine comprising means connected to be driven at a speed proportional to entering article speed, means connected to be driven at a speed proportional to exit article speed, a differential receiver connected to both of said means for obtaining the difference in their speeds, a tachometer generator driven by said differential receiver, a tachometer generator driven at a speed proportional to entering article speed, and means for comparing the voltage outputs of the generators to indicate the amount of elongation of the article.

2. An extensometer for determining the elongation of an elongated article passing through a reducing machine comprising a motion transmitting device connected to be driven at a speed proportional to entering article speed, a second motion transmitting device connected to be driven at a speed proportional to exit article speed, a differential receiver connected to said motion transmitting devices for obtaining the difference in their speeds, a tachometer generator driven by said differential receiver, a tachometer generator driven at a speed proportional to entering article speed, and means for comparing the voltage outputs of the generators to indicate the amount of elongation of the article.

3. An extensometer for determining the elongation of an elongated article passing through a reducing machine comprising a Selsyn transmitter connected to be driven at a speed proportional to entering article speed, a second Selsyn transmitter connected to be driven at a speed proportional to exit article speed, a Selsyn receiver connected to the Selsyn transmitters for obtaining the difference in their speeds, a tachometer generator driven by said Selsyn receiver, a tachometer generator driven at a speed proportional to entering article speed, and means for comparing the voltage outputs of the generators to indicate the amount of elongation of the article.

4. Apparatus for comparing the speed relationship between two moving objects which comprises means connected to be driven at a speed proportional to the speed of one of the objects, means connected to be driven at a speed proportional to the speed of the other object, a differential receiver connected to both of said means for obtaining the difference in their speeds, a tachometer generator driven by said differential receiver, a tachometer generator driven at a speed proportional to the speed of one of the objects, and means for comparing the voltage outputs of the generators to indicate the speed relationship.

5. Apparatus for comparing the speed relationship between two moving objects which comprises a motion transmitting device connected to be driven at a speed proportional to the speed of one of the objects, a second motion transmitting device connected to be driven at a speed proportional to the other object, a differential receiver connected to said motion transmitting devices for obtaining the difference in their speeds, a tachometer generator driven by said differential receiver, a tachometer generator driven at a speed proportional to the speed of one of said objects, and means for comparing the voltage outputs of the generators to indicate the speed relationship.

6. Apparatus for comparing the speed relationship between two moving objects which comprises a Selsyn transmitter connected to be driven at a speed proportional to the speed of one of said objects, a second Selsyn transmitter connected to be driven at a speed proportional to the speed of the other object, a Selsyn receiver connected to the Selsyn transmitters for obtaining the difference in their speeds, a tachometer generator driven by said Selsyn receiver, a tachometer generator driven at a speed proportional to the speed of one of said objects, and means for comparing the voltage outputs of the generators to indicate the speed relationship of the objects.

7. An extensometer for determining the elongation of an elongated article passing through a reducing machine comprising means connected to be driven at a speed proportional to entering article speed, means connected to be driven at a speed proportional to exit article speed, a differential receiver connected to both of said means for obtaining the difference in their speeds, a tachometer generator driven by said differential receiver, a tachometer generator driven at a speed proportional to entering article speed, means for measuring the voltage output of the first named generator to indicate the ratio between entry and exit article speed, means for measuring the voltage output of the second named generator to indicate entry article speed, and means for comparing these values to indicate percentage elongation.

8. An extensometer for determining the elongation of an elongated article passing through a reducing machine comprising means connected to be driven at a speed proportional to entering article speed, means connected to be driven at a speed proportional to exit article speed, a differential receiver connected to both of said means for obtaining the difference in their speeds, a tachometer generator driven by said differential receiver, means for measuring the voltage output of the generator to indicate the ratio between entry and exit article speed, means for measuring entry article speed, and means for comparing the voltage output and entry article speed to indicate percentage elongation.

9. Apparatus for comparing the speed relationship between two moving objects which comprises means connected to be driven at a speed proportional to the speed of one of the objects, means connected to be driven at a speed proportional to the speed of the other object, a differential receiver connected to both of said means for obtaining the difference in their speeds, a tachometer generator driven by said differential receiver, means for measuring the voltage output of said generator, means for measuring the speed of one of the objects, and means for comparing the voltage output and the measured speed of the said object to indicate the speed relationship between the objects.

GEORGE H. RENDEL.

REFERENCES CITED

The following references are of record in the file of this patent:

UNITED STATES PATENTS

| Number | Name | Date |
| --- | --- | --- |
| 1,510,440 | Gilman | Sept. 30, 1924 |
| 1,612,117 | Hewlett et al. | Dec. 23, 1926 |
| 1,655,244 | Howell | Jan. 3, 1928 |
| 1,686,638 | Pierce | Oct. 9, 1928 |
| 1,897,472 | French | Feb. 14, 1933 |
| 2,205,330 | Allen | June 18, 1940 |
| 2,211,657 | Hudson | Aug. 13, 1940 |
| 2,248,504 | Kenny | July 8, 1941 |
| 2,339,612 | Bechberger | Jan. 18, 1944 |